United States Patent
Farooq et al.

(10) Patent No.: US 12,077,218 B2
(45) Date of Patent: Sep. 3, 2024

(54) FASTENER FOR FRAME STRUCTURE OF VEHICLE

(71) Applicant: Ford Global Technologies, LLC, Dearborn, MI (US)

(72) Inventors: S. M. Iskander Farooq, Novi, MI (US); Mohammad Omar Faruque, Ann Arbor, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 198 days.

(21) Appl. No.: 17/847,010

(22) Filed: Jun. 22, 2022

(65) Prior Publication Data

US 2023/0415824 A1    Dec. 28, 2023

(51) Int. Cl.
*B62D 27/02*    (2006.01)
*B62D 21/02*    (2006.01)

(52) U.S. Cl.
CPC .......... *B62D 27/023* (2013.01); *B62D 21/02* (2013.01)

(58) Field of Classification Search
CPC ...... B62D 21/02; B62D 21/11; B62D 21/155; B62D 25/08; B62D 25/2018; B62D 27/023; B62D 27/065
See application file for complete search history.

(56) References Cited

U.S. PATENT DOCUMENTS

| | | | | |
|---|---|---|---|---|
| 4,984,947 A | * | 1/1991 | Flauraud | F16B 19/00 411/339 |
| 5,385,369 A | * | 1/1995 | Mukai | B60G 7/00 280/788 |
| 5,484,217 A | * | 1/1996 | Carroll | E01F 9/642 248/548 |
| 5,605,353 A | * | 2/1997 | Moss | B62D 21/09 188/376 |
| 5,915,494 A | * | 6/1999 | Matsumura | B60K 17/04 180/297 |
| 6,109,654 A | * | 8/2000 | Yamamoto | B62D 21/11 280/124.109 |
| 6,371,519 B1 | * | 4/2002 | Jurik | B62D 1/192 74/492 |
| 6,431,600 B1 | * | 8/2002 | Freisler | B60R 21/216 280/751 |
| 8,794,646 B1 | * | 8/2014 | Onishi | B60G 7/02 296/203.02 |
| 9,150,253 B2 | * | 10/2015 | Watanabe | B62D 27/065 |
| 9,776,661 B2 | * | 10/2017 | Kaneko | B62D 21/155 |
| 11,104,382 B2 | * | 8/2021 | Yoshimoto | B62D 21/155 |

(Continued)

FOREIGN PATENT DOCUMENTS

| | | |
|---|---|---|
| CN | 108582964 | 9/2018 |
| CN | 109808771 | 5/2019 |
| DE | 102005005004 | 8/2006 |

(Continued)

*Primary Examiner* — Laura Freedman
(74) *Attorney, Agent, or Firm* — Burris Law, PLLC

(57) ABSTRACT

A fastener includes a head, a tail, and a body disposed between the head and the tail. The body includes a first portion that includes a lattice structure and a second portion that includes a solid structure. The second portion has an axial length that is greater than an axial length of the first portion. The lattice structure is configured to fracture under a predetermined loading condition.

20 Claims, 7 Drawing Sheets

(56) References Cited

U.S. PATENT DOCUMENTS

| | | | | |
|---|---|---|---|---|
| 11,787,476 B2 * | 10/2023 | Ghislieri | ................ | B62D 27/00 |
| | | | | 296/187.09 |
| 2006/0083585 A1 * | 4/2006 | Lew | .......................... | F16F 1/38 |
| | | | | 403/365 |

FOREIGN PATENT DOCUMENTS

| JP | 4256695 | | 4/2009 |
|---|---|---|---|
| JP | 2016188054 A | * | 11/2016 |
| JP | 2017128175 A | * | 7/2017 |
| KR | 101198602 B1 | * | 11/2012 |
| KR | 20130087835 A | * | 8/2013 |
| KR | 20140004384 A | * | 1/2014 |
| KR | 20160069529 A | * | 6/2016 |
| KR | 20170055634 A | * | 5/2017 |
| KR | 1020210123790 | | 10/2021 |

\* cited by examiner

FASTENER FOR FRAME STRUCTURE OF VEHICLE

FIELD

The present disclosure relates to a fastener for a frame structure of a vehicle and a vehicle including a frame structure having a fastener.

BACKGROUND

The statements in this section merely provide background information related to the present disclosure and may not constitute prior art.

Some vehicles include a subframe located at a front end of the vehicle. Components of a powertrain system, such as an engine and transmission, are assembled to and supported by the subframe. The subframe of the vehicle is coupled to structural members of a main frame, e.g., structural members of a unibody frame vehicle, or main frame rails of a body on frame vehicle by a plurality of fasteners. During some vehicle impact events, it may be desirable for these fasteners to fracture at a predetermined load, thereby permitting the subframe and the powertrain system to move in a downward direction.

SUMMARY

This section provides a general summary of the disclosure and is not a comprehensive disclosure of its full scope or all of its features.

In one form, the present disclosure discloses a fastener that includes a head, a tail, and a body disposed between the head and the tail. The body includes a first portion that includes a lattice structure. The lattice structure is configured to fracture under a predetermined loading condition.

In variations of the fastener of the above paragraph, which can be implemented individually or in combination: the body includes a second portion, the second portion has a greater axial length than the first portion; the first portion and the second portion have equal outer diameters; the second portion includes a shear strength that is greater than a shear strength of the first portion; the first portion includes an outer profile that corresponds to an outer profile of the second portion; the first portion of the body is made of a material that is different than a material of the second portion of the body; the first portion of the body comprising the lattice structure is located at a center portion of the body; the first portion of the body comprising the lattice structure includes a hollow central portion; and a coating covering the body, the coating comprising a material selected from the group consisting of zinc and an elastomer.

In another form, the present disclosure discloses a fastener that includes a head, a tail, and a body disposed between the head and the tail. The body includes a first portion that includes a lattice structure and a second portion that includes a solid structure. The second portion includes an outer profile that corresponds to an outer profile of the first portion and has an axial length that is greater than an axial length of the first portion. The lattice structure is configured to fracture under a predetermined loading condition.

In yet another form, the present disclosure discloses a frame structure of a vehicle that includes a main frame, a subframe and a fastener connecting the main frame to the subframe. The subframe is configured to support a powertrain system of the vehicle. The fastener includes a head, a tail, and a body disposed between the head and the tail. The body includes a first portion that includes a lattice structure and a second portion that includes a solid structure. The second portion includes an outer profile that corresponds to an outer profile of the first portion. The lattice structure is configured to fracture under a predetermined loading condition to detach the main frame and the subframe from each other.

In variations of the frame structure of the above paragraph, which can be implemented individually or in combination: the first portion of the body comprising the lattice structure is located at a center portion of the body; the first portion of the body comprising the lattice structure includes a hollow central portion; and a coating covers the body, the coating comprising a material selected from the group consisting of zinc and an elastomer.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
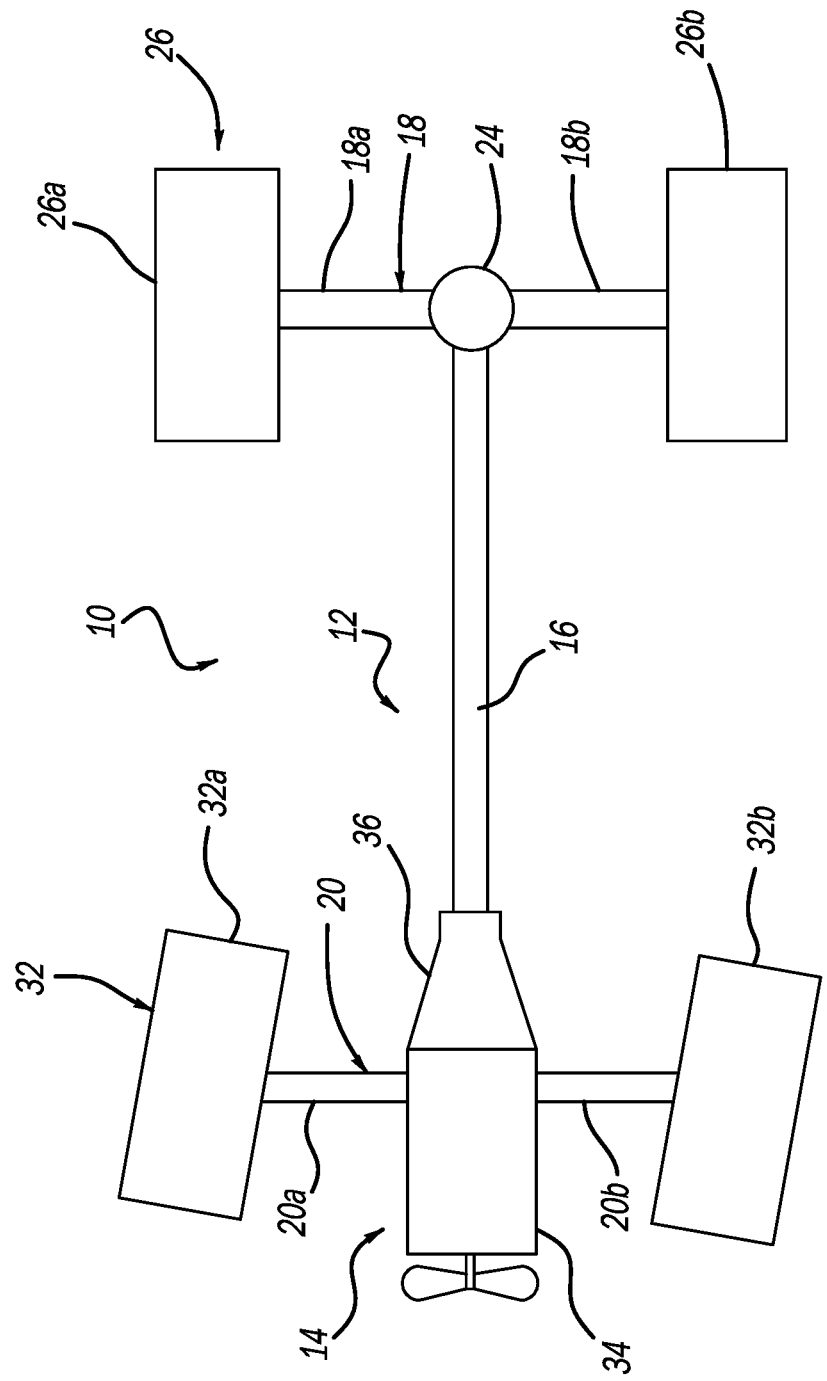
FIG. 1 is a schematic view of a vehicle according to the principles of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIG. 1, a vehicle 10 is provided that includes a drivetrain system 12 and a powertrain system 14. In the particular configuration shown in FIG. 1, the drivetrain system 12 includes, inter alia, a propeller shaft 16, a primary axle 18, a secondary axle 20, and a rear differential 24. Rotary power (vehicle torque) generated by the powertrain system 14 is transmitted to the drivetrain system 12. That is, rotary power generated by the powertrain system 14 is transmitted to the primary axle 18 via the propeller shaft 16 to drive a set of rear wheels 26. The primary axle 18 includes a first shaft 18a and a second shaft 18b. The first and second shafts 18a, 18b receive rotary power from the propeller shaft 16 via the rear differential 24. The first shaft 18a drives a first wheel 26a of the set of rear wheels 26 and the second shaft 18b drives a second wheel 26b of the set of rear wheels 26. The secondary axle 20 includes a first shaft 20a and a second shaft 20b. The first shaft 20a is connected to a first wheel 32a of a set of front wheels 32 and the second shaft 20b is connected to a second wheel 32b of the set of front wheels 32. The powertrain system 14 includes an engine 34 and a transmission 36. The engine 34 generates rotary power and may be an internal combustion engine, for example. The transmission 36 transmits rotary power from the engine 34 to the drivetrain system 12. While described herein with reference to a rear-wheel drive configuration, other configurations can be used such as front-wheel drive, four-wheel drive, or all-wheel drive for example. While described here with reference to an internal combustion engine, it is understood that the teachings of the present disclosure can also apply to electric or hybrid vehicles in which one or more wheels are driven entirely or partially by electric motors for example.

With additional reference to FIGS. 2-5, the vehicle 10 further includes a vehicle frame 40, which acts as the main support structure of the vehicle 10 to which various components are attached either directly or indirectly. In the example provided, the vehicle 10 is a unibody vehicle architecture, though other configurations can be used, such as a body on frame vehicle architecture for example. In the example provided, the vehicle frame 40 includes opposed longitudinal rails 42a, 42b and a front-end structure 44. The rails 42a, 42b are spaced apart from each other. Cross members 42c (only one shown in the figures) extend in a transverse direction relative to a longitudinal direction (i.e., forward/rearward direction) of the vehicle 10 and connect the longitudinal rails 42a, 42b to each other.

Figure 2:
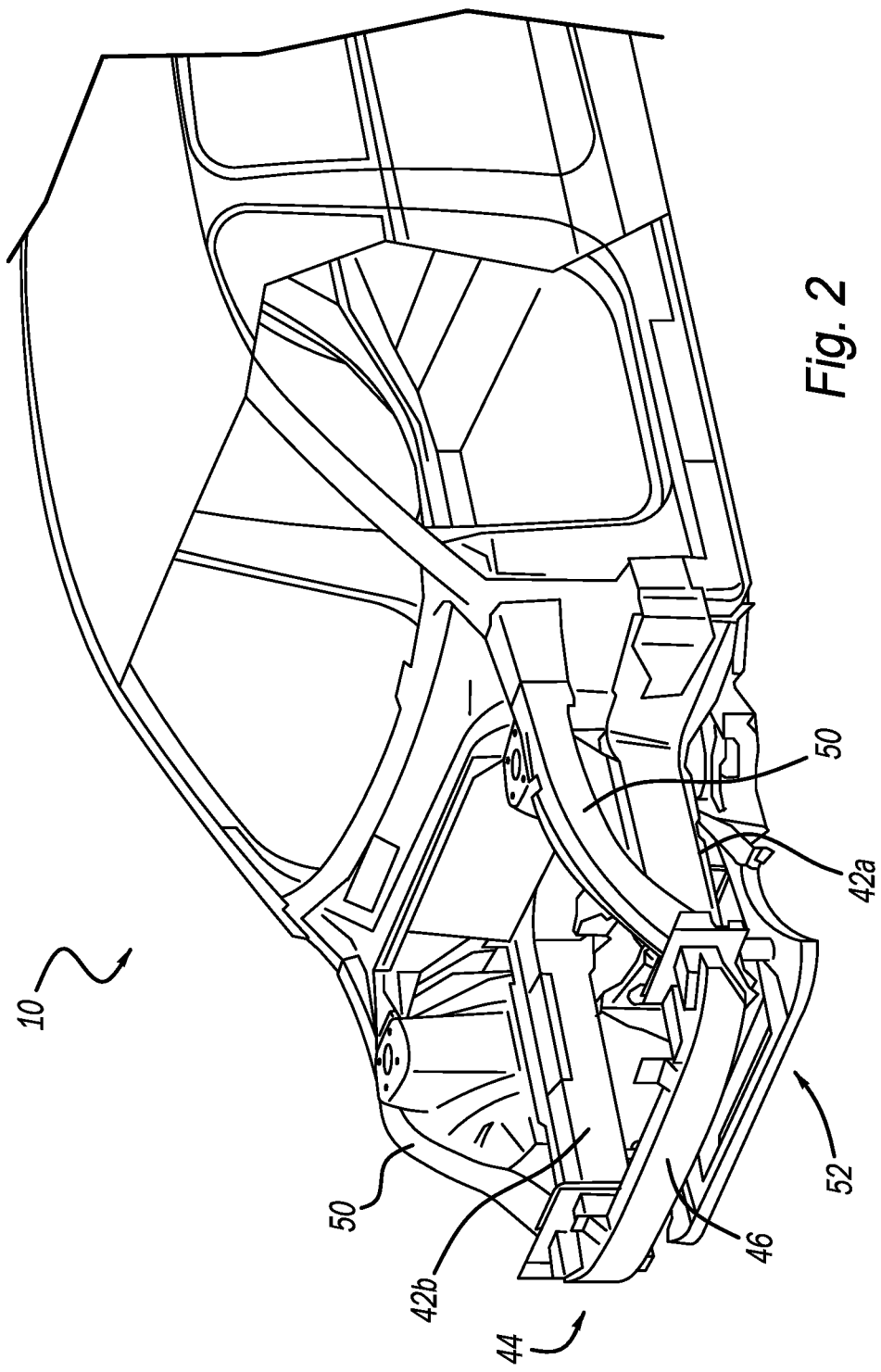
FIG. 2 is a perspective view of a portion of a vehicle frame of the vehicle of FIG. 1.
Figure 3:
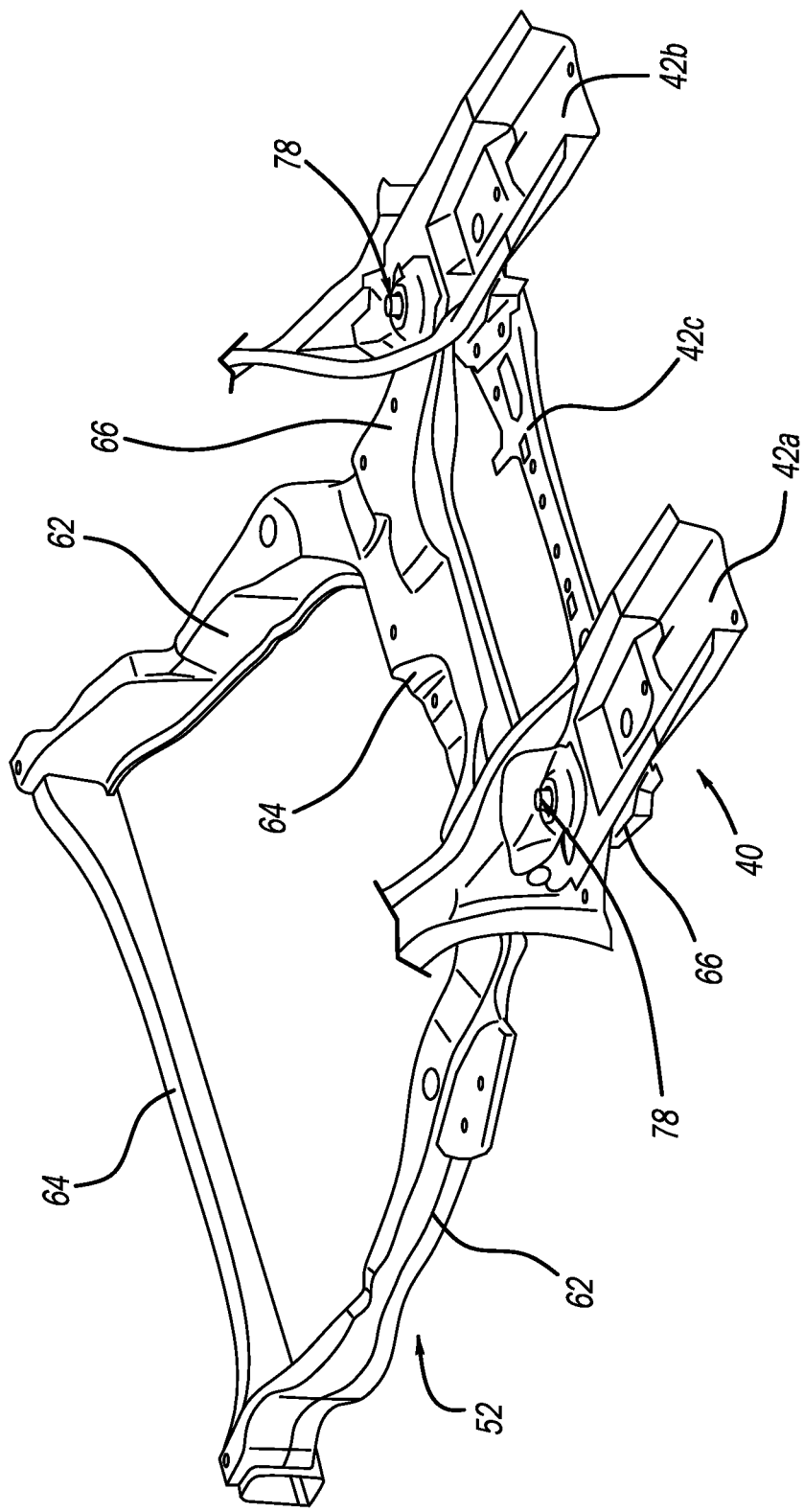
FIG. 3 is a perspective view of longitudinal rails of the vehicle frame of FIG. 2 connected to a front-end structure of the vehicle frame by a plurality of fasteners.
Figure 4:
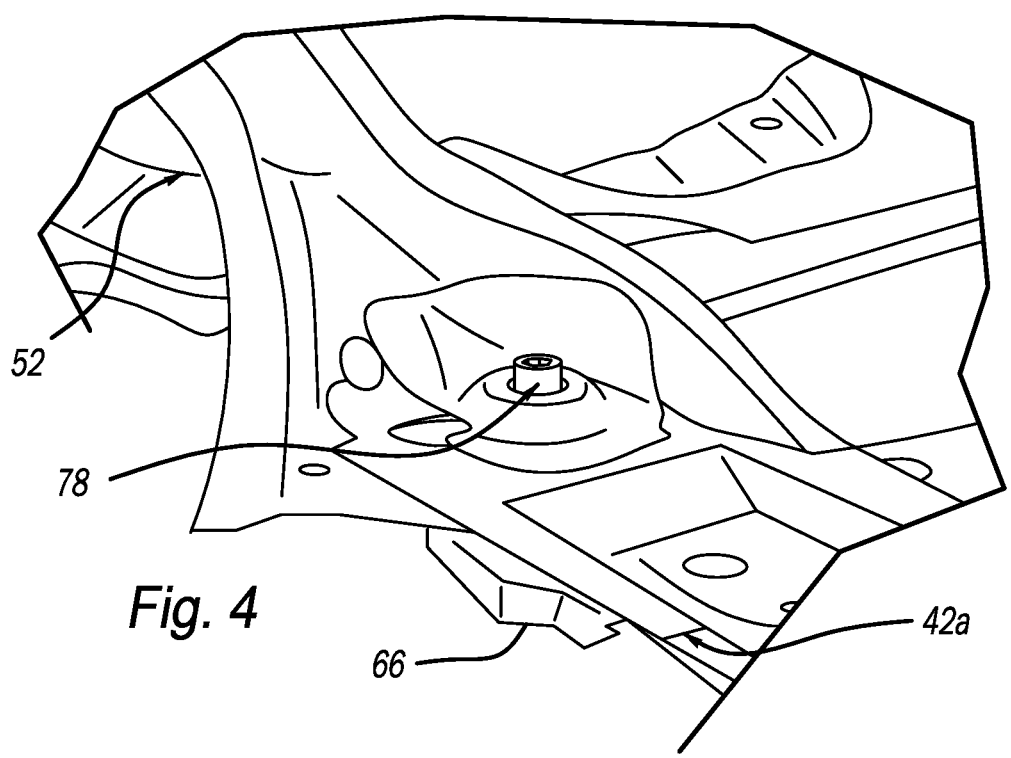
FIG. 4 is an enlarged perspective view of one rail of the longitudinal rails of the vehicle frame of FIG. 2 connected to the front-end structure of the vehicle frame by one fastener of the plurality of fasteners.
Figure 5:
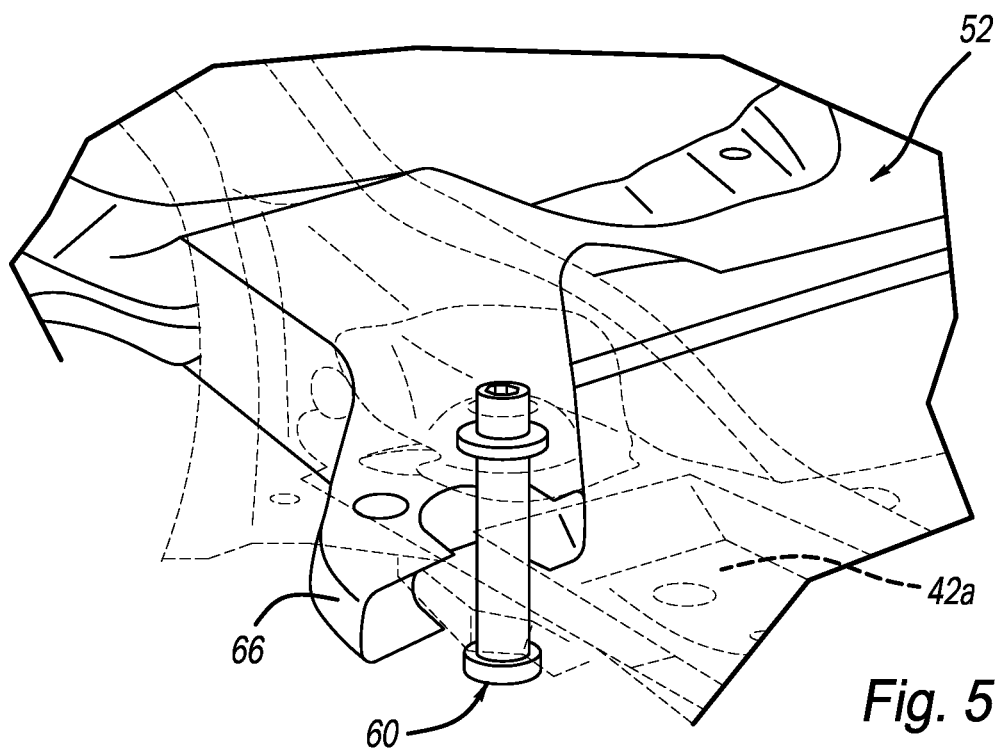
FIG. 5 is an enlarged perspective view of one rail of the longitudinal rails of the vehicle frame of FIG. 2 connected to the front-end structure of the vehicle frame by one fastener of the plurality of fasteners with the rail shown in hidden lines for clarity.
Figure 6:
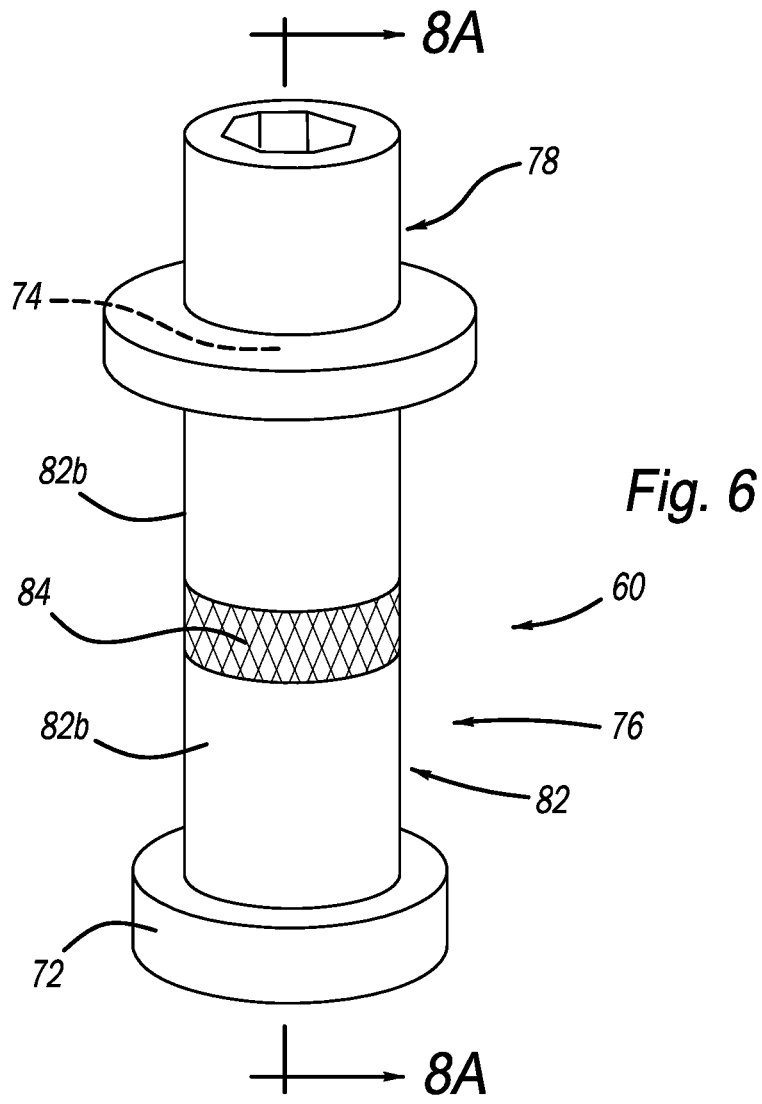
FIG. 6 is a perspective view of one fastener of the plurality of fasteners of FIG. 3 without a protective coating.
Figure 7:
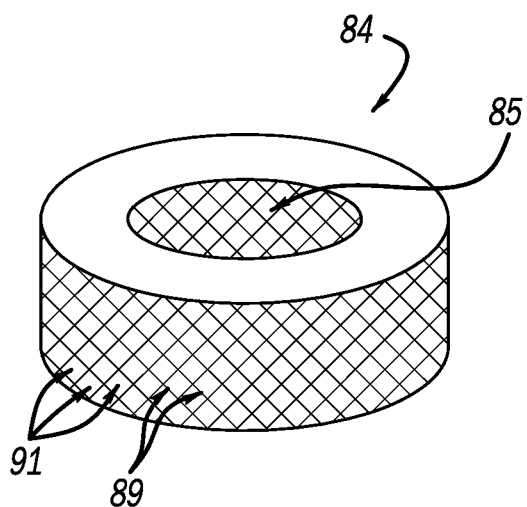
FIG. 7 is a perspective view of a portion of the fastener of FIG. 6.
Figure 8A:
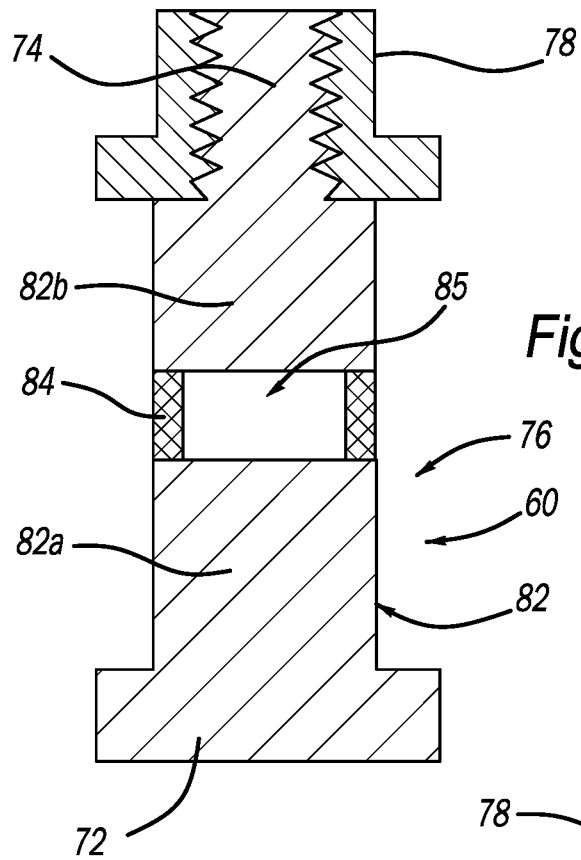
FIG. 8A is a cross-sectional view of the fastener taken along line 8a-8a of FIG. 6.
Figure 8B:
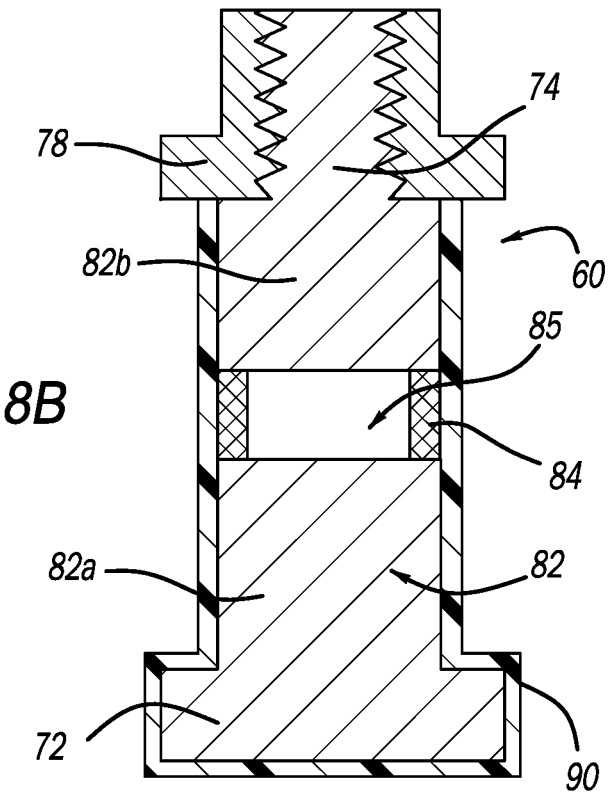
FIG. 8B is a cross-sectional view of the fastener comprising a protective coating.

As shown in FIG. 2, the front-end structure 44 includes a bumper 46, a pair of opposed upper rails 50, and a subframe 52. The bumper 46 extends in a transverse direction relative to the longitudinal direction of the vehicle 10 and is secured to front ends of the rails 42a, 42b. In some forms, the front ends of the rails 42a, 42b are arcuate and extend around a respective front wheel of the vehicle 10 and forms a portion of a respective front wheel well. The upper rails 50 are positioned above the front ends of the rails 42a, 42b and extend from an upper portion of the body of the vehicle 10 (e.g., the respective hinge pillar). The upper rails 50 also form a portion of a respective front wheel well.

The subframe 52 is positioned below a front suspension system (not shown) of the vehicle 10 and is secured to the longitudinal rails 42a, 42b by a plurality of fasteners 60 as will be described in more detail below. The subframe 52 may support one or more components of the vehicle 10 such as the powertrain system 14 and portions of the drivetrain system 12.

The subframe 52 includes a pair of opposed lateral members 62, a plurality of connecting members 64, and a pair of opposed arms 66. The lateral members 62 extend generally along the longitudinal direction of the vehicle 10 and are interconnected via the connecting members 64 extending in a transverse direction relative to the longitudinal direction of the vehicle 10. Front ends of the lateral members 62 are secured to the front end of the rails 42a, 42b. Each arm 66 extends from a rear end of a respective lateral member 62 and extends along a respective front wheel well of the vehicle 10. Each arm 66 is also secured to a respective longitudinal rail 42a, 42b by one or more of the fasteners 60. Control arms (not shown) are coupled to the subframe 52 at one end and to a respective front wheel 32a, 32b at another end, thereby securing the front wheel 32a, 32b to the vehicle 10.

Figure 9:
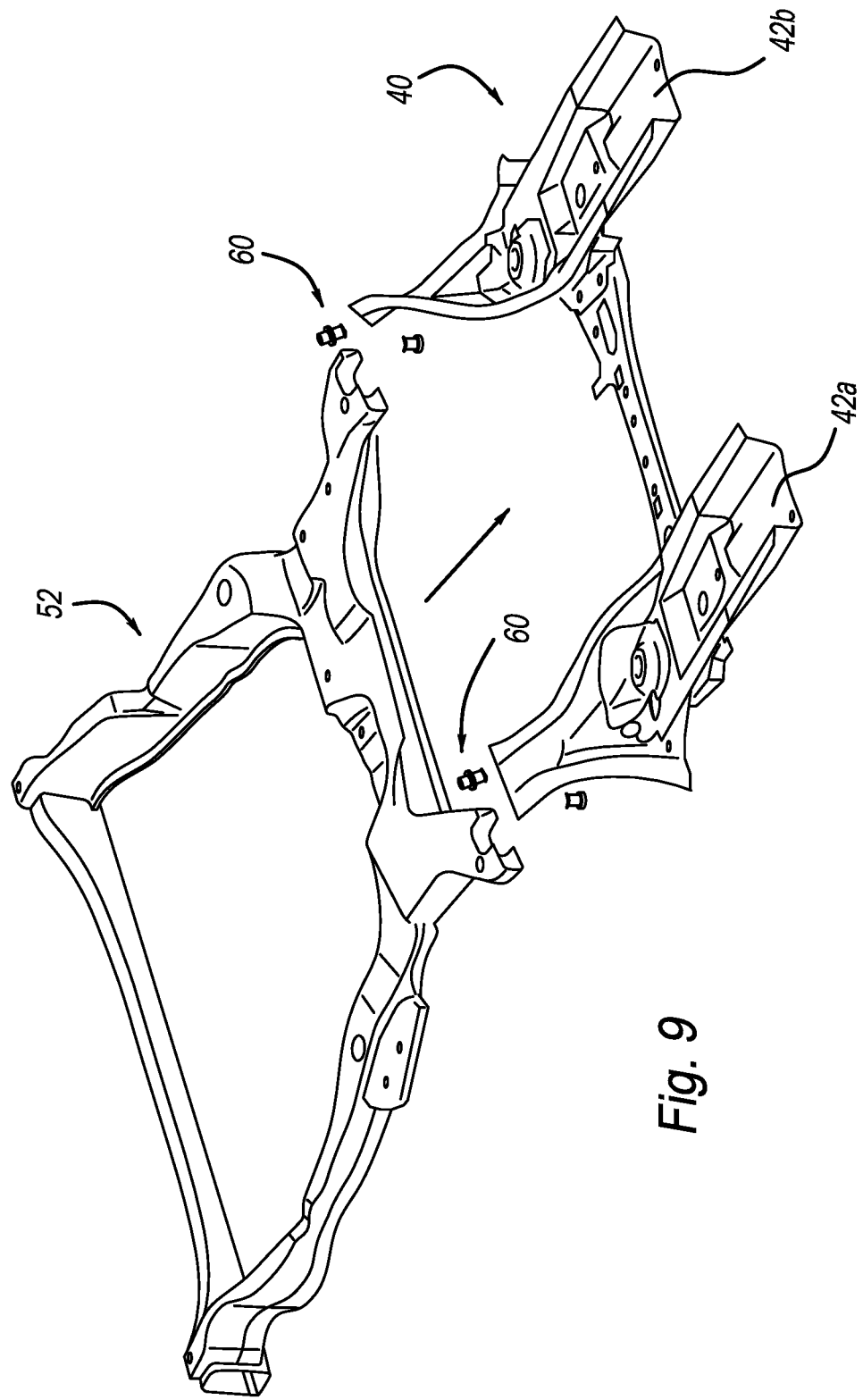
FIG. 9 is a perspective view of the vehicle frame of FIG. 2 showing the fasteners fracturing in a predetermined manner in accordance with the teachings of the present disclosure.

Each fastener 60 is in the form of a single, monolithic body that can be manufactured by an additive manufactured process. In this way, the fastener 60 can be manufactured having one or more materials and configured to fracture under a predetermined loading condition (i.e., a vehicle impact event), thereby detaching subframe 52 and the rails 42a, 42b from each other (FIG. 9). The manufacturing process can include laser sintering, for example, that can generally include a laser, a means for applying subsequent layers of powdered sintering material (e.g., metal powder), and a controller that controls operation of the laser and the amount and timing of the deposition of the metal powder. It should be understood that other 3D printing/additive manufacturing methods may be employed to achieve the unitized, monolithic body, along with a variety of different materials, while remaining within the scope of the present disclosure.

With reference to FIGS. 3-8, the plurality of fasteners 60 extend vertically through the rails 42a, 42b and the arms 66 of the subframe 52, thereby connecting the rails 42a, 42b and the subframe 52 to each other. Each fastener 60 includes a head 72, a tail 74, and a body 76 disposed between the head 72 and the tail 74. In some forms, each fastener 60 has a continuously variable material composition along its length (i.e., from the head 72 to the tail 74), or has different materials in different zones. For example, the head 72 and the tail 74 may be made of a different material than the body 76. The head 72 includes an outer diameter that is larger than outer diameters of the body 76 and the tail 74. In some forms, the tail 74 includes an external portion comprising threads. A nut 78 may be coupled to the respective rail 42a, 42b and, in one form, may extend at least partially through the respective rail 42a, 42b. The nut 78 is threaded to the threads of the tail 74. In some forms, the nut 78 is integral with (i.e., welded to) the respective rail 42a, 42b.

The body 76 includes a plurality of portions 82, 84 made of the same or different materials. In the example illustrated, the portion 82 comprises a plurality of sections 82a, 82b having a solid, uniform structure. In one example, the solid section 82a is made of carbon steel and the solid section 82b is made of boron steel. In another example, the solid section 82a and the solid section 82b are made of carbon steel. In the example illustrated, the solid sections 82a, 82b are disposed on opposing sides of the portion 84 and include external profiles having the same shape (i.e., a cylindrical shape). In other words, the solid section 82a can be between the head 72 and the portion 84 while the solid section 82b is between the portion 84 and the tail 74. In some forms, the external profiles of the solid sections 82a, 82b have different shapes. That is, the external profile of the solid section 82a can be octagonal and the external profile of the solid section 82b can be cylindrical. An axial length of the solid section 82a can be greater than or equal to an axial length of the solid section 82b. The combined axial length of the solid sections

82a, 82b (i.e., the sum of the axial lengths) is greater than an axial length of the portion 84. For example, the combined axial length of the solid sections 82a, 82b may be at least five (5) times greater than the axial length of the portion 84. Stated differently, if the combined axial length of the solid sections 82a, 82b is 10 millimeters (mm), the axial length of the portion 84 is 2 millimeters (mm).

The portion 84 comprises a lattice structure configured to fracture under a predetermined loading condition. Stated differently, the lattice portion 84 comprises a lattice structure formed of a plurality of struts 89 oriented in a predetermined pattern to define voids 91 between the struts 89. In this way, the shear strength of the lattice portion 84 is predetermined. For example, the solid portion 82 can have a shear strength that is greater than a shear strength of the lattice portion 84. In the example illustrated, the lattice portion 84 comprises an external profile that corresponds to the external profiles of the solid sections 82a, 82b. That is, in the example illustrated, the external profile of the lattice portion 84 is cylindrical to match the cylindrical shape external profiles of the solid sections 82a, 82b. In some forms, the lattice portion 84 comprises an external profile that is different from the external profiles of the solid sections 82a, 82b. In the example illustrated, the lattice portion 84 is located at a center area of the body 76. In some forms, the lattice portion 84 is located at or near ends of the body 76. In the example illustrated, the lattice portion 84 includes a hollow center 85 having a cylindrical shape internal profile. In this way, the weight of the fastener 60 is reduced. In some forms, the lattice structure also occupies the center of the lattice portion 84. The lattice structure is a macroscopic lattice structure.

A protective coating 90 may cover the fastener 60 and provides a uniform appearance to the fastener 60. In this way, the lattice portion 84 of the body 76 is not visible when viewing the fastener 60. In one example, the protective coating 90 protects the fastener 60 from corrosion. The protective coating 90 may be made of zinc or an elastomeric material, for example. In the example illustrated, the protective coating covers the body 76 and the head 72. In some forms, the protective coating covers the entire fastener (i.e., body 76, the head 72 and the tail 74). In one example, the fastener 60 may be coated with the protective coating 90 using a dip/spin process where the fastener 60 is 1) cleaned, 2) coated with the protective coating 90, and 3) cured. In another example, the fastener 60 may be coated using a galvanizing process where the fastener 60 is placed in a perforated metal basket and completely immersed in a molten zinc bath.

The fasteners 60 of the present disclosure being additively manufactured provides the benefit of allowing a portion of the body 76 to comprise a lattice structure. In this way, the portion of the body 76 having the lattice structure can include a shear strength that is predetermined and that differs from the shear strength of the remaining portion of the body 76. Although the fasteners 60 of the present disclosure are shown connecting the subframe 52 and the rails 42a, 42b to each other, it should also be understood that the fasteners 60 can be used in other applications where a predetermined shear strength of the fasteners 60 are desired.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A single, monolithic fastener comprising:
   a head;
   a tail; and
   a body disposed between the head and tail, wherein a first portion of the body comprises a lattice structure configured to fracture under a predetermined loading condition.

2. The fastener of claim 1, wherein the body includes a second portion, and wherein the second portion has a greater axial length than the first portion.

3. The fastener of claim 2, wherein the first portion and the second portion have equal outer diameters.

4. The fastener of claim 2, wherein the second portion includes a shear strength that is greater than a shear strength of the first portion.

5. The fastener of claim 2, wherein the first portion includes an outer profile that corresponds to an outer profile of the second portion.

6. The fastener of claim 2, wherein the first portion of the body is made of a material that is different than a material of the second portion of the body.

7. The fastener of claim 1, wherein the first portion of the body comprising the lattice structure is located at a center portion of the body.

8. The fastener of claim 1, wherein the first portion of the body comprising the lattice structure includes a hollow central portion.

9. The fastener of claim 1, further comprising a coating covering the body, the coating comprising a material selected from the group consisting of zinc and an elastomer.

10. A single, monolithic fastener comprising:
   a head;
   a tail; and
   a body disposed between the head and tail, the body comprising a first portion including a lattice structure and a second portion including a solid structure, the second portion includes an outer profile that corresponds to an outer profile of the first portion and has an axial length that is greater axial than an axial length of the first portion,
   wherein the lattice structure is configured to fracture under a predetermined loading condition.

11. The fastener of claim 10, wherein the outer profiles of the first and second portions of the body are cylindrical, and wherein the outer profiles have equal diameters.

12. The fastener of claim 10, wherein the second portion includes a shear strength that is greater than a shear strength of the first portion.

13. The fastener of claim 10, wherein the first portion of the body comprising the lattice structure is located at a center portion of the body.

14. The fastener of claim 10, wherein the first portion of the body comprising the lattice structure includes a hollow central portion.

15. The fastener of claim 10, further comprising a coating covering the body, the coating comprising a material selected from the group consisting of zinc and an elastomer.

16. The fastener of claim 10, wherein the first portion of the body is made of a material that is different than a material of the second portion of the body.

17. A frame structure of a vehicle comprising:
   a main frame;
   a subframe configured to support a powertrain system of the vehicle; and
   a single, monolithic fastener connecting the main frame to the subframe, the fastener comprising:
      a head;
      a tail; and
      a body disposed between the head and tail, the body comprising a first portion including a lattice structure and a second portion including a solid structure, the second portion includes an outer profile that corresponds to an outer profile of the first portion,
   wherein the lattice structure is configured to fracture under a predetermined loading condition to detach the main frame and the subframe from each other.

18. The frame structure of claim 17, wherein the first portion of the body comprising the lattice structure is located at a center portion of the body.

19. The frame structure of claim 17, wherein the first portion of the body comprising the lattice structure includes a hollow central portion.

20. The frame structure of claim 17, further comprising a coating covering the body, the coating comprising a material selected from the group consisting of zinc and an elastomer.

* * * * *